(12) United States Patent
Brar et al.

(10) Patent No.: US 10,372,459 B2
(45) Date of Patent: Aug. 6, 2019

(54) TRAINING AND UTILIZATION OF NEURAL BRANCH PREDICTOR

(71) Applicant: QUALCOMM Incorporated, San Diego, CA (US)

(72) Inventors: Gurkanwal Brar, Mountain View, CA (US); Christopher Ahn, San Diego, CA (US); Gurvinder Singh Chhabra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,112

(22) Filed: Sep. 21, 2017

(65) Prior Publication Data
US 2019/0087193 A1 Mar. 21, 2019

(51) Int. Cl.
*G06F 9/38* (2018.01)

(52) U.S. Cl.
CPC .......... *G06F 9/3848* (2013.01); *G06F 9/3806* (2013.01)

(58) Field of Classification Search
None
See application file for complete search history.

(56) References Cited

U.S. PATENT DOCUMENTS

| | | | |
|---|---|---|---|
| 5,761,490 A | 6/1998 | Hunt | |
| 7,673,122 B1 * | 3/2010 | Song | G06F 9/3846 712/239 |
| 7,802,236 B2 * | 9/2010 | Calder | G06F 11/3466 717/130 |
| 9,104,435 B2 | 8/2015 | Potkonjak | |
| 9,471,314 B1 * | 10/2016 | Bonanno | G06F 9/3848 |
| 9,639,370 B1 | 5/2017 | Gschwind et al. | |
| 2005/0278513 A1 | 12/2005 | Aristodemou et al. | |
| 2008/0072024 A1 * | 3/2008 | Davis | G06F 9/325 712/239 |
| 2009/0287912 A1 * | 11/2009 | Sendag | G06F 9/3848 712/240 |
| 2010/0262813 A1 * | 10/2010 | Brown | G06F 8/433 712/240 |

(Continued)

OTHER PUBLICATIONS

Jimenez, Daniel A., An Optimized Scaled Neural Branch Predictor, IEEE, pp. 113-118. (Year: 2011).*

(Continued)

*Primary Examiner* — Eric Coleman
(74) *Attorney, Agent, or Firm* — MG-IP Law, P.C.

(57) ABSTRACT

Systems and methods for branch prediction include identifying a subset of branch instructions from an execution trace of instructions executed by a processor. The identified subset of branch instructions have greater benefit from branch predictions made by a neural branch predictor than branch predictions made by a non-neural branch predictor. During runtime, the neural branch predictor is selectively used for obtaining branch predictions of the identified subset of branch instructions. For remaining branch instructions outside the identified subset of branch instructions, branch predictions are obtained from a non-neural branch predictor. Further, a weight vector matrix comprising weight vectors for the identified subset of branch instructions of the neural branch predictor is pre-trained based on the execution trace.

26 Claims, 5 Drawing Sheets

(56) References Cited

U.S. PATENT DOCUMENTS

2010/0332812 A1 12/2010 Burger et al.

OTHER PUBLICATIONS

Amant R.S., et al., "Mixed-Signal Approximate Computation: A Neural Predictor Case Study," Browse Journals & Magazines, IEEE Computer Society, 2009, pp. 104-115.
Black M., et al., "Applying Perceptrons to Computer Architecture", IEEE, Proceedings of International Conference on Intelligent Sensing and Information Processing, 2005, pp. 336-341.
Jime'nez D.A., et al., "Neural Methods for Dynamic Branch Prediction", ACM Transactions on Computer Systems, vol. 20, No. 4, Nov. 2002, pp. 369-397.
Bellare K., et al., "Dynamic Branch Prediction using Machine Learning Algorithms," Mar. 17, 2006, XP55533199, 10 pages, Retrieved from the Internet: URL: https://pdfs.semanticscholar.org/fdb5/580652c685afaac32758c2add527830ea199.pdf [retrieved on Dec. 12, 2018].
International Search Report and Written Opinion—PCT/US2018/047270—ISA/EPO—dated Dec. 21, 2018.
Vintan L.N., et al: "Dynamic Neural Branch Prediction Fundamentals," Jan. 1, 2016, XP055533437, 8 pages, Retrieved from the Internet: URL: http://www.agir.ro/buletine/2501.pdf [retrieved on Dec. 12, 2018].
St Amant R.M., "Enabling High-Performance, Mixed-Signal Approximate Computing", Texas Scholar Works, The University of Texas At Austin, May 2014, 172 Pages.

* cited by examiner

FIG. 3

TRAINING AND UTILIZATION OF NEURAL BRANCH PREDICTOR

FIELD OF DISCLOSURE

Disclosed aspects are directed to branch prediction in processing systems. More specifically, exemplary aspects are directed to improved training and utilization of neural branch predictors for branch prediction.

BACKGROUND

Processing systems may employ instructions which cause a change in control flow, such as conditional branch instructions. The direction of a conditional branch instruction is based on how a condition evaluates, but the evaluation may only be known deep down an instruction pipeline of a processor. To avoid stalling the pipeline until the evaluation is known, the processor may employ branch prediction mechanisms to predict the direction of the conditional branch instruction early in the pipeline. Based on the prediction, the processor can speculatively fetch and execute instructions from a predicted address in one of two paths—a "taken" path which starts at the branch target address, with a corresponding direction referred to as the "taken direction"; or a "not-taken" path which starts at the next sequential address after the conditional branch instruction, with a corresponding direction referred to as the "not-taken direction".

When the condition is evaluated and the actual branch direction is determined, if the branch was mispredicted, (i.e., execution followed a wrong path) the speculatively fetched instructions may be flushed from the pipeline, and new instructions in a correct path may be fetched from the correct next address. Accordingly, improving accuracy of branch prediction for conditional branch instructions mitigates penalties associated with mispredictions and execution of wrong path instructions, and correspondingly improves performance and energy utilization of a processing system.

Conventional branch prediction mechanisms may include one or more state machines which may be trained with a history of evaluation of past and current branch instructions. For example, a bimodal branch predictor uses two bits per branch instruction (which may be indexed using a program counter (PC) of the branch instruction, and also using functions of the branch history as well as a global history involving other branch instruction histories) to represent four prediction states: strongly taken, weakly taken, weakly not-taken, and strongly not-taken, for the branch instruction. While such branch prediction mechanisms are relatively inexpensive and involve a smaller footprint (in terms of area, power consumption, latency, etc.), their prediction accuracies are also seen to be low.

More complex branch prediction mechanisms are emerging in the art for improving prediction accuracies. Among these, complex branch prediction mechanisms, so called neural branch predictors (e.g., Perceptron, Fast Path branch predictors, Piecewise Linear branch predictors, etc.) utilize bias weights and weight vectors derived from individual branch histories and/or global branch histories in making branch predictions. However, these complex branch prediction mechanisms may also incur added costs in terms of area, power, and latency. The energy and resources expended in training the neural branch predictors for obtaining the bias weights, weight vectors, etc., as well as in utilizing the complex branch prediction mechanisms are seen to be particularly wasteful when mispredictions occur, albeit at a lower rate than the mispredictions which may result from the use of the simpler branch prediction mechanisms such as the bimodal branch predictor.

Furthermore, it is also observed that the benefits of neural branch predictors, e.g., measured in terms of branch prediction accuracy, are not uniform for all branch instructions. Rather, a subset of branch instructions (e.g., globally dependent branch instructions, branch instructions used in state-based workloads) are seen to gain the most significant benefits from neural branch prediction whereas the remaining branch instructions are observed to not have a significant improvement in their prediction accuracy. Furthermore, this subset of branch instructions which benefit from the neural branch predictors is also observed to cover a very small number of the overall set of branch instructions in a given application or workload.

However, conventional approaches which utilize neural branch predictors do not take into account the disproportionate benefit of the neural branch predictors across the set of branch instructions for which predictions are obtained. In other words, the neural branch predictors are used in obtaining branch predictions for all branch instructions without regard to potential benefits of utilizing such expensive mechanisms in each individual case. This leads to over-utilization of neural branch predictors and associated area, power, and latency costs in approaches wherein neural branch predictors are employed.

On the other hand, some approaches may avoid neural branch predictors altogether due to their high costs in terms of area, power, latency in conventional implementations wherein all branch instructions are predicted using the neural branch predictors. Thus, the benefits of neural branch predictors are lost in these cases for all branch instructions.

Thus, there is observed to be a potential opportunity for improving the deployment of neural branch predictors in a manner which avoids wasteful utilization while also improving the benefits of neural branch predictors in suitable cases.

SUMMARY

Exemplary aspects of the invention are directed to systems and method for branch prediction. A subset of branch instructions executable by a processor are identified, based on information obtained from using an execution trace, wherein the identified subset of branch instructions are determined to have larger benefit from a neural branch predictor than a non-neural branch predictor. The neural branch predictor is selectively used for obtaining branch predictions of the identified subset of branch instructions. For remaining branch instructions outside the identified subset of branch instructions, branch predictions are obtained from a non-neural branch predictor. Further, a weight vector matrix comprising weight vectors for the identified subset of branch instructions of the neural branch predictor is pre-trained based on the execution trace. The pre-trained weight vectors may be used as initial weights which may be updated during runtime or as static weights used by the neural branch predictor during runtime.

For example, an exemplary aspect is directed to a method of branch prediction. The method comprises identifying a subset of branch instructions from an execution trace of instructions executed by a processor, wherein the identified subset of branch instructions have greater benefit from branch predictions made by a neural branch predictor than branch predictions made by a non-neural branch predictor. During runtime, the method further comprises selectively using the neural branch predictor for obtaining branch predictions of the identified subset of branch instructions, and the non-neural branch predictor for obtaining branch predictions for remaining branch instructions outside the identified subset of branch instructions.

Another exemplary aspect is directed to a method of branch prediction, the method comprising pre-training a weight vector used in a neural branch predictor for predicting a branch instruction by determining, from an execution trace of a processor, initial weights for the weight vector, and during runtime, using the pre-trained weight vector in the neural branch predictor for obtaining a branch prediction for a branch instruction belonging the execution trace.

Another exemplary aspect is directed to an apparatus comprising a neural branch predictor configured to provide neural branch predictions and a non-neural branch predictor configured to provide non-neural branch predictions. The apparatus includes a filter configured to identify subset of branch instructions from an execution trace of instructions executed by a processor, wherein the identified subset of branch instructions have greater benefit from branch predictions made by a neural branch predictor than branch predictions made by a non-neural branch predictor. The filter is configured to, during runtime: selectively direct the identified subset of branch instructions to the neural branch predictor and the remaining branch instructions outside the identified subset of branch instructions to the non-neural branch predictor.

Yet another exemplary aspect is directed to a non-transitory computer-readable storage medium comprising code, which, when executed by a computer, causes the computer to perform operations for branch prediction, the non-transitory computer-readable storage medium comprising code for identifying a subset of branch instructions from an execution trace of instructions executed by a processor, wherein the identified subset of branch instructions have greater benefit from branch predictions made by a neural branch predictor than branch predictions made by a non-neural branch predictor, and code for, during runtime, selectively using the neural branch predictor for obtaining branch predictions of the identified subset of branch instructions, and the non-neural branch predictor for obtaining branch predictions for remaining branch instructions outside the identified subset of branch instructions.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to systems and methods for branch prediction which overcome the aforementioned drawbacks of conventional deployment of neural branch predictors. A subset of branch instructions which are likely to gain the most benefit from neural branch predictors is identified in advance, for example by analyzing execution traces related to instruction sets comprising the set of branch instructions executable by a processor. For this identified subset of branch instructions, neural branch predictors are selectively utilized. Further, the training of the neural branch predictors is focused on the identified subset of branch instructions, rather than taking into account all the branch instructions in an instruction set. The selective training and utilization of the neural branch predictor for predicting only the branch instructions of the identified subset of branch instructions leads to improvement in area and power utilization while also reducing latencies involved.

In this disclosure, neural branch predictors generally refers to branch prediction mechanisms which utilize a weight vector comprising a set of weights which may be updated based on branching behavior and history of individual branch instructions as well as global history. Perceptron, Fast Path, Piecewise Linear predictor, etc., are known in the art as examples of such neural branch predictors. Branch predictors such as TAGE (which is an abbreviation of (partially) TAgged GEometric history length) which utilize contexts and histories in branch prediction may also be considered as examples of neural branch predictors. Similarly, various other complex branch prediction mechanisms which may have a larger benefit for a subset of branch predictions in accordance with this disclosure are also considered to be within the scope of the neural branch predictors discussed herein.

For remaining branch instructions outside the identified subset of branch instructions, simpler branch prediction mechanisms, also referred to as non-neural branch prediction mechanisms to distinguish them from the neural branch predictors, may be employed. Bimodal branch predictors, as known in the art, are described herein as one example of a non-neural branch prediction mechanism which may be used for branch prediction of the remaining branch instructions. Various other such branch predictors which may base predictions on a counter or state without involving the complex branch prediction mechanisms which are seen in neural branch predictors may also be considered as non-neural branch predictors to support hybrid approaches of using combinations of neural and non-neural branch predictors according to this disclosure.

In one aspect, branch instructions in the identified subset are determined to benefit more from neural branch predictors by comparing prediction accuracies of the branch instructions using a neural branch predictor as well as with a non-neural branch predictor, while also taking into account the frequency of occurrence of the branch instruction. For example, the benefit with respect to a branch instruction may be quantified as a difference between misprediction percentages or rates using the non-neural branch predictor and the neural branch predictor, with the difference multiplied by the frequency of occurrence of the branch instruction in the execution trace.

Figure 1A:
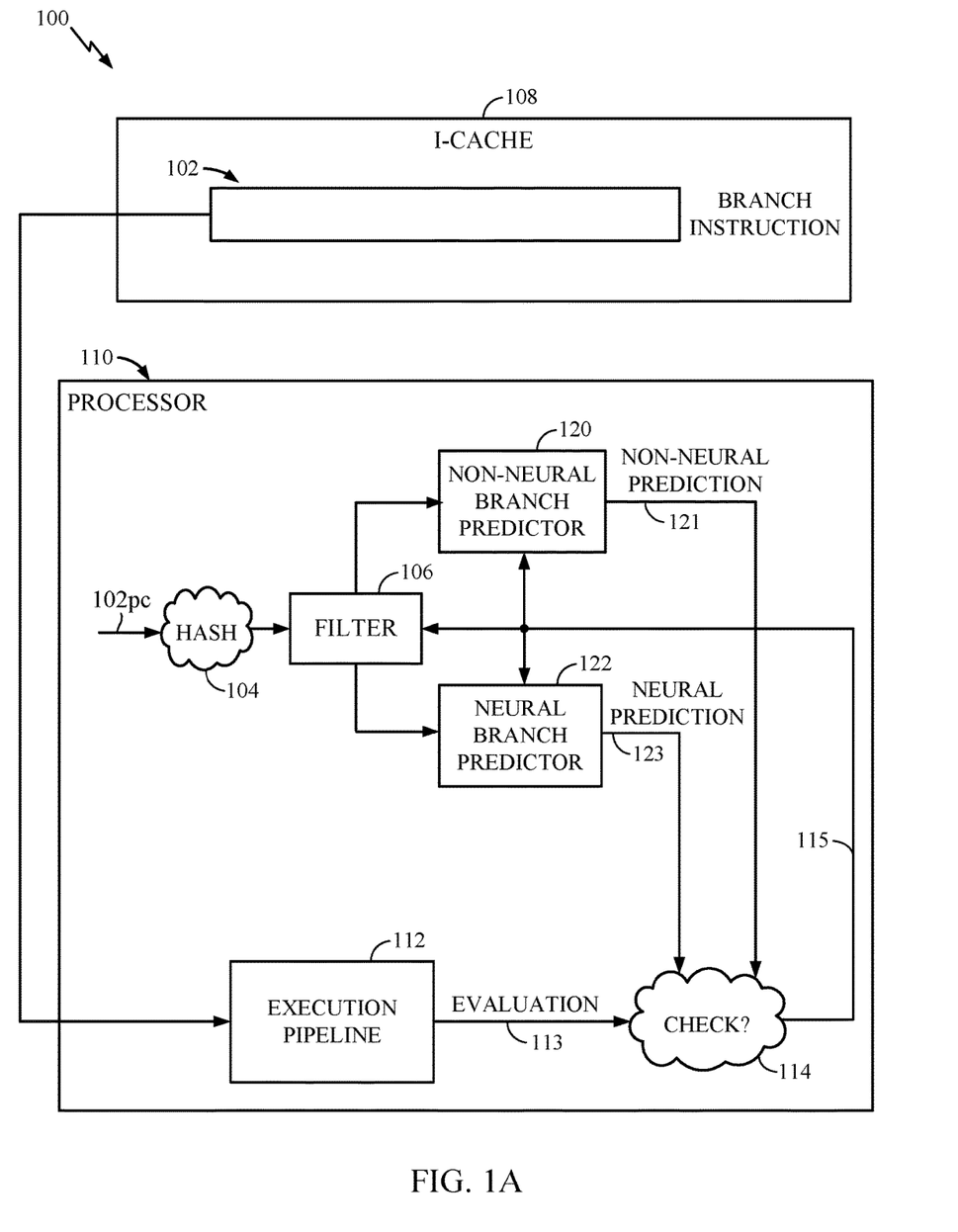
FIG. 1A illustrates a processing system according to aspects of this disclosure.

With reference now to FIG. 1A, an exemplary processing system 100 in which aspects of this disclosure may be employed, will first be described. Processing system 100 is shown to comprise processor 110 coupled to instruction cache 108. Although not shown in this view, additional components such as functional units, input/output units, interface structures, memory structures, etc., may also be present but have not been explicitly identified or described as they may not be germane to this disclosure. As shown, processor 110 may be configured to receive instructions from instruction cache 108 and execute the instructions using for example, execution pipeline 112. Execution pipeline 112 may be configured to include one or more pipelined stages such as instruction fetch, decode, execute, write back, etc., as known in the art.

Representatively, a branch instruction is shown in instruction cache 108 and identified as branch instruction 102.

In an exemplary implementation, branch instruction 102 may have a corresponding address or program counter (PC) value of 102*pc*. When branch instruction 102 is fetched by processor 110 for execution, logic such as hash 104 (e.g., implementing an XOR function) may utilize the PC value 102*pc* (and/or other information such as a history of branch instruction 102 or global history) to access filter 106. In some implementations, hash 104 may not be present, and filter 106 may be directly accessed using the PC value 102*pc*.

Example implementations of filter 106 will be explained with reference to FIG. 1B. Filter 106 is generally configured to filter out branch instructions, based on their PC values, for which a neural branch predictor will be beneficial for predicting their branch directions. In this regard, filter 106 is configured to identify a subset of branch instructions whose direction will be predicted by a complex branch prediction mechanism, exemplarily shown as neural branch predictor 122 (although it will be understood that the precise implementation of the complex branch prediction mechanism is not germane to this discussion, and as such, in various examples, neural branch predictor 122 may be implemented as a Perceptron, Fast Path, Piecewise Linear predictor, etc., or Tage predictors as known in the art). From neural branch predictor 122, neural prediction 123 is obtained for those branch instructions belonging to the identified subset.

For the remaining branch instructions which do not belong to the identified subset of branch instructions directed to neural branch predictor 122, filter 106 is configured to direct them to a simpler or non-neural branch predictor, which, for the sake of illustration is shown as non-neural branch predictor 120. Non-neural branch predictor 120 may be implemented as a bimodal branch predictor, as known in the art, with a two-bit saturating counter which may be incremented upon a correct prediction and decremented upon a misprediction, with the two-bit saturating counter's value being representative of one of the four states: strongly not-taken, weakly not-taken, weakly taken, and strongly taken. Based on the current value of a two-bit saturating counter, e.g., pertaining to branch instruction 102, non-neural branch predictor 120 is configured to provide a bimodal prediction shown as non-neural prediction 121, which may be used for speculative execution of the remaining branch instructions. In exemplary aspects, for the remaining branch instructions for which non-neural branch predictor 120 may be utilized as noted above, neural branch predictor 122 may be gated off or powered down which can lead to energy savings.

Continuing with the description of FIG. 1A, branch instruction 102 may be speculatively executed in execution pipeline 112 (based on a direction corresponding to either non-neural prediction 121 or neural prediction 123). After traversing one or more pipeline states, an actual evaluation of branch instruction 102 will be known, and this is shown as evaluation 113. Evaluation 113 is compared with the corresponding prediction for the branch instruction 102 (either non-neural prediction 121 or neural prediction 123) in prediction check block 114 to determine whether evaluation 113 matched the corresponding prediction (i.e., to determine whether branch instruction 102 was correctly predicted) or mismatched the corresponding neural prediction 123 (i.e., branch instruction 102 was mispredicted). In an example implementation, bus 115 comprises information comprising the correct evaluation 113 (taken/not-taken) as well as whether branch instruction 102 was correctly predicted or mispredicted. The information on bus 115 may be supplied to respective non-neural branch predictor 120 and to neural branch predictor 122. The information on bus 115 may be used to update the corresponding state machines, history, weight vectors, bias values, etc. The information on bus 115 may also be supplied to filter 106 for updating the filtering process, as will be explained in further detail in the following sections.

Figure 1B:
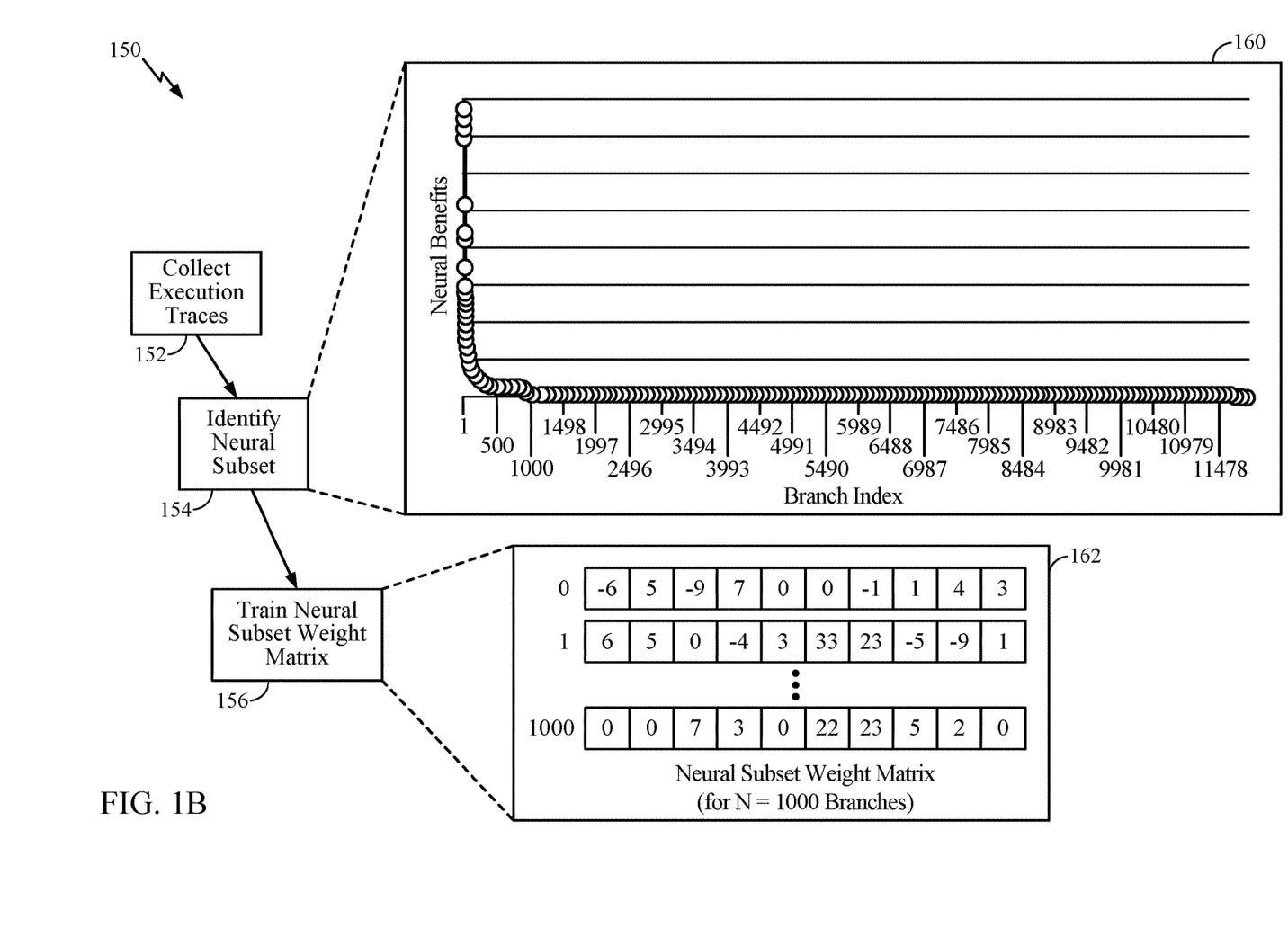
FIG. 1B illustrates an implementation of a filter to direct a subset of branch instructions to a neural branch predictor, according to aspects of this disclosure.

With reference now to FIG. 1B, an exemplary implementation of filter 106 will be described with reference to process 150. Starting with block 152, execution traces of instructions executed by processor 110 are collected. For the purposes of this analysis, all branch instructions in the execution trace may be predicted using a neural branch predictor such as neural branch predictor 122, as well as with non-neural branch predictor 120. The misprediction percentages or rates of both neural branch predictor 122, as well as non-neural branch predictor 120 in predicting the branch instructions may be calculated. The frequency of occurrence may also be obtained in the execution trace for each branch instruction whose misprediction percentages are calculated. In one aspect, the benefit of using neural branch predictor 122 for a branch instruction may be quantified as: (misprediction rate using non-neural branch predictor 120−misprediction rate using neural branch predictor 122)*frequency of the branch instruction (or in other words, a difference in misprediction rates of non-neural branch predictor 120 and neural branch predictor 122, the difference multiplied by the frequency of the branch instruction. Alternative techniques for comparing benefits of non-neural branch predictor 120 and neural branch predictor 122 for making branch predictions for the branch instructions in the execution trace may also be used without deviating from the scope of this disclosure. A comparison of the benefits leads to identification of the subset of branch instructions which benefit more from neural branch predictor 122, and for this subset, neural branch predictor 122 may be used at runtime.

The above process pertaining to block 152 may be performed offline or in a simulation mode and is distinguished from a runtime operation (or simply, "runtime", also referred to as execution or active instruction processing). For instance, processor 110 may be provided with logic (not separately shown, but may be provided in or in association with filter 106, for example) configured to determine, for each branch instruction in the execution trace: a frequency of the branch instruction in the execution trace and a difference between misprediction rates using neural branch predictor 122 and the non-neural branch predictor 120, and multiply the difference by the frequency. The logic may be further configured to tabulate the benefits using neural branch predictor 122, e.g., in a graph shown as graph 160 with the benefits on the y-axis. On the x-axis, branch instructions from the instruction trace are ordered in descending order of the benefits, with index values starting with 1 being assigned to the branch instructions in the descending order.

As can be observed in the illustrated example of graph 160, the subset of branch instructions having indices from 1 to 1000 have non-zero benefits of using neural branch predictor 122 in their branch prediction, whereas the remaining branch instructions, starting approximately with index 1000 have no apparent benefits. Even within this subset of branch instructions having indices from 1 to 1000, a smaller number (e.g., with indices smaller than 500) are seen to have significantly larger benefits than the remaining branch instructions with indices of up to 1000. Thus, an even smaller number of branch instructions than the number of branch instructions with non-zero benefits may be chosen to belong to the identified subset of branch instructions for which neural branch predictor 122 may be used in making branch predictions. It will be understood that the above numerical values are merely for the sake of illustration and are not to be construed as implying any inherent limitation on the precise number or proportion of branch instructions in an instruction set which may benefit from neural branch prediction.

In block 154, graph 160 is consulted to identify the subset of branch instructions (e.g., based on PC values 102*pc* or some other identifier from an encoding of the branch instructions, whose indices correspond to the indices between 0 and 1000 in the above example which have significant benefits from neural branch prediction). This identification of the subset of branch instructions may be provided to filter 106 at run time for filter 106 to direct branch instructions whose PC values 102*pc* match the indices between 0 and 1000 to neural branch predictor 122 at runtime. As previously noted, a significant proportion of the benefits from neural branch prediction may be achieved with using neural branch predictor 122 for making branch predictions for a number of branches which is significantly lower than 1000, because as shown, even though the benefits are seen to diminish for indexes larger than 1000, the benefits are seen to taper off even before the index of 1000 are reached, starting from index 1. It is also apparent from FIG. 1B that using neural branch predictor 122 for all branch instructions, or even any number of branch instructions past index 1000 would be wasteful because there will not be any benefit from doing so.

Accordingly, during an offline process, the identified subset of branch instructions is provided to block 156. Block 156 represents an operation of pre-training neural branch predictor 122. Neural branch predictor 122 may have a weight vector for each one of the branch instructions which are predicted using neural branch predictor 122. In example implementations of neural branch predictor 122, the weight vectors are pre-trained based on a history of respective branch instructions as well as global history. In general, the more or better trained the weight vector is for a branch instruction, the better is the accuracy of prediction of the branch instruction's direction. Weight vectors 1-1000 are shown for respective branch instructions with indices 0-1000 in weight vector matrix 162 which may be implemented in neural branch predictor 122. As will be recognized, weight vector matrix 162 is only shown to comprise weight vectors for the identified subset of branch instructions and not the entire set of branch instructions. This allows a smaller area and power consumption of neural branch predictor 122 as well as a more efficient training process wherein history of branch instructions which may not benefit from neural branch predictor 122 are not considered or allowed to affect or corrupt the training process.

Although not shown, various other aspects such as bias weights, global branch history tables, etc., may also be present in neural branch predictor 122 to aid in the branch prediction of the identified subset of branch instructions. In an example implementation, an initial bias weight and corresponding initial weight vector for branch instruction 102 may be generated during the pre-training, which may be obtained using the index associated with branch instruction 102. In one aspect, these initial weights (bias weight, weight vector, etc.) may be used as static weights in branch prediction of branch instruction 102, using neural branch predictor 122.

In some aspects, the initial weights may be used as starting points and the initial weights may be updated during runtime as neural branch predictor 122 used in more branch predictions of branch instruction 102 as well as remaining branch instructions using the following example process. A combination of the indexed weight vector, associated bias weight, and global history may be used to generate a partial sum as known in the art, e.g., using the example formula, partial sum=bias weight+vector product (indexed weight vector, global history). Neural prediction 123 is obtained in one example as corresponding to the sign of the partial sum, wherein, positive and negative signs may respectively correspond to taken and not-taken predictions, without loss of generality. As mentioned with reference to FIG. 1A, once evaluation 113 is obtained for branch instruction 102, the information on bus 115 is utilized to update the indexed weight vector for branch instruction 102 accordingly. The precise processes involved in generating, maintaining, and updating the bias weights, weight vectors in weight vector matrix 162, etc., are beyond the scope of this disclosure, but have been briefly mentioned herein for the sake of illustration of one exemplary aspect.

As previously mentioned, weight vectors in weight vector matrix 162 are initially generated (e.g., offline or prior to runtime) for the identified subset of branch instructions based on the execution traces collected in block 152. In some aspects, the initially generated weight vectors may be used as static weight values during runtime, while in other aspects, they may be used as initial values which may get updated during runtime. Generating the initial weight vectors in this manner is also referred to as pre-training or offline training of the weight vectors in this disclosure. Pre-training the weight vectors, specifically for the identified subset of branch instructions for which neural branch predictor 122 will be used for branch prediction enables weight vector matrix 162 to be pre-trained or warmed up at runtime. As can be appreciated, pre-training speeds up the process of warming up neural branch predictor 122 at runtime, which leads to further improvements in speed, efficiency, and accuracy of branch prediction of the identified subset of branch instructions using neural branch predictor 122.

Furthermore, it will be appreciated that the above-described techniques of pre-training need not be limited to pre-training weight vectors of only the identified subset of branch instructions in weight vector matrix 162, but may be extended to branch prediction of any branch instruction. In other words, for any branch instruction, initial weight values of a corresponding weight vector may be obtained from an execution trace and these initial weight values may be relied upon during runtime by a neural branch predictor used to predict the branch instruction. Thus, even if neural branch predictor 122 were to be used for branch prediction of other branch instructions outside the identified subset of branch instructions, pre-training related weight vectors for the other branch instructions would speed up convergence to desired accuracy levels using neural branch predictor 122. As such, benefits of pre-training weight vectors based on execution traces may be achieved for any branch instruction for which neural branch predictor 122 is used for branch prediction.

Figure 2A:
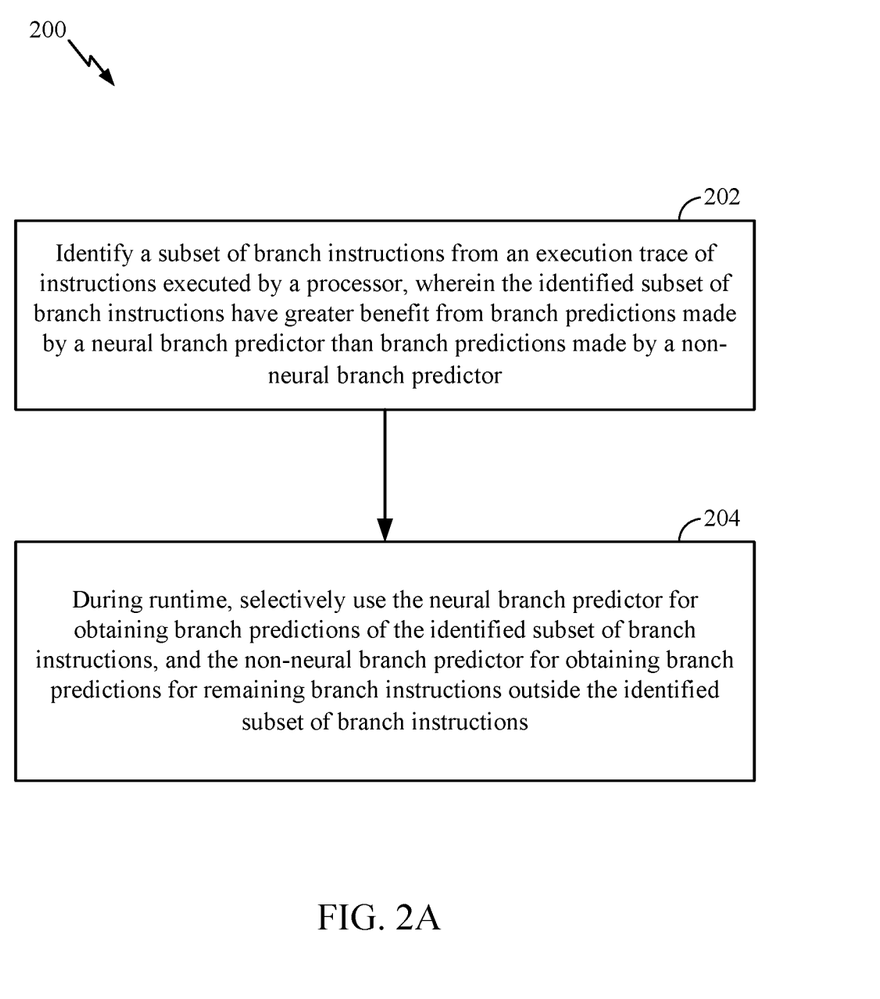
FIGS. 2A-B illustrate flow-charts for branch prediction methods, according to aspects of this disclosure.

Accordingly, it will be appreciated that exemplary aspects include various methods for performing the processes, functions and/or algorithms disclosed herein. For example, FIG. 2A illustrates a method 200 of branch prediction.

Block 202 comprises identifying a subset of branch instructions from an execution trace of instructions executed by a processor, wherein the identified subset of branch instructions have greater benefit from branch predictions made by a neural branch predictor than branch predictions made by a non-neural branch predictor (e.g., identifying branch instructions associated with indices 1 to 1000 from graph 160 in block 154 based on the execution traces collected in block 152 of FIG. 1B).

Block 204 comprises during runtime, selectively using the neural branch predictor for obtaining branch predictions of the identified subset of branch instructions, and the non-neural branch predictor for obtaining branch predictions for remaining branch instructions outside the identified subset of branch instructions (e.g., based on the PC of the branch instruction or one or more bits embedded in an encoding of the branch instruction, directing the branch instruction to neural branch predictor 122 or to non-neural branch predictor 120 by filter 106 in FIG. 1A for branch instructions of the identified subset).

Figure 2B:
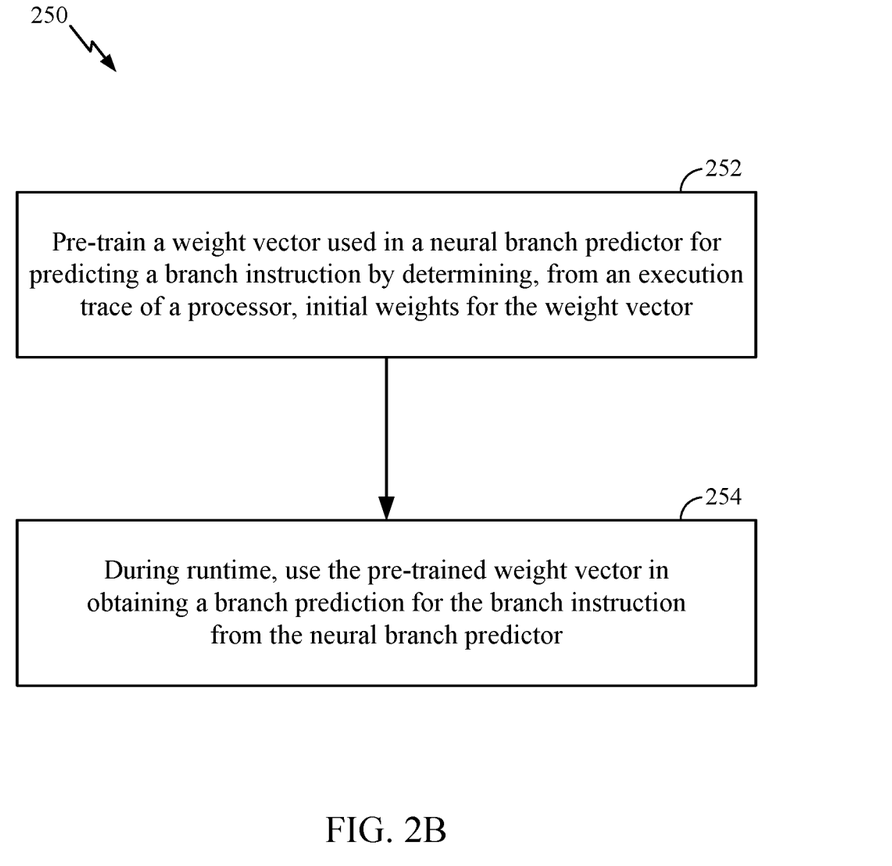

FIG. 2B illustrates another method, method 250, of branch prediction.

Block 252 pertains to pre-training a weight vector (e.g., a weight vector such as in weight vector matrix 162 used in a neural branch predictor (e.g., neural branch predictor 122) for predicting a branch instruction by determining, from an execution trace of a processor (e.g., collected in block 152), initial weights for the weight vector.

Block 254 comprises, during runtime, using the pre-trained weight vector in obtaining a branch prediction for the branch instruction from the neural branch predictor (e.g., using the pre-trained vector during runtime in processor 110).

Figure 3:
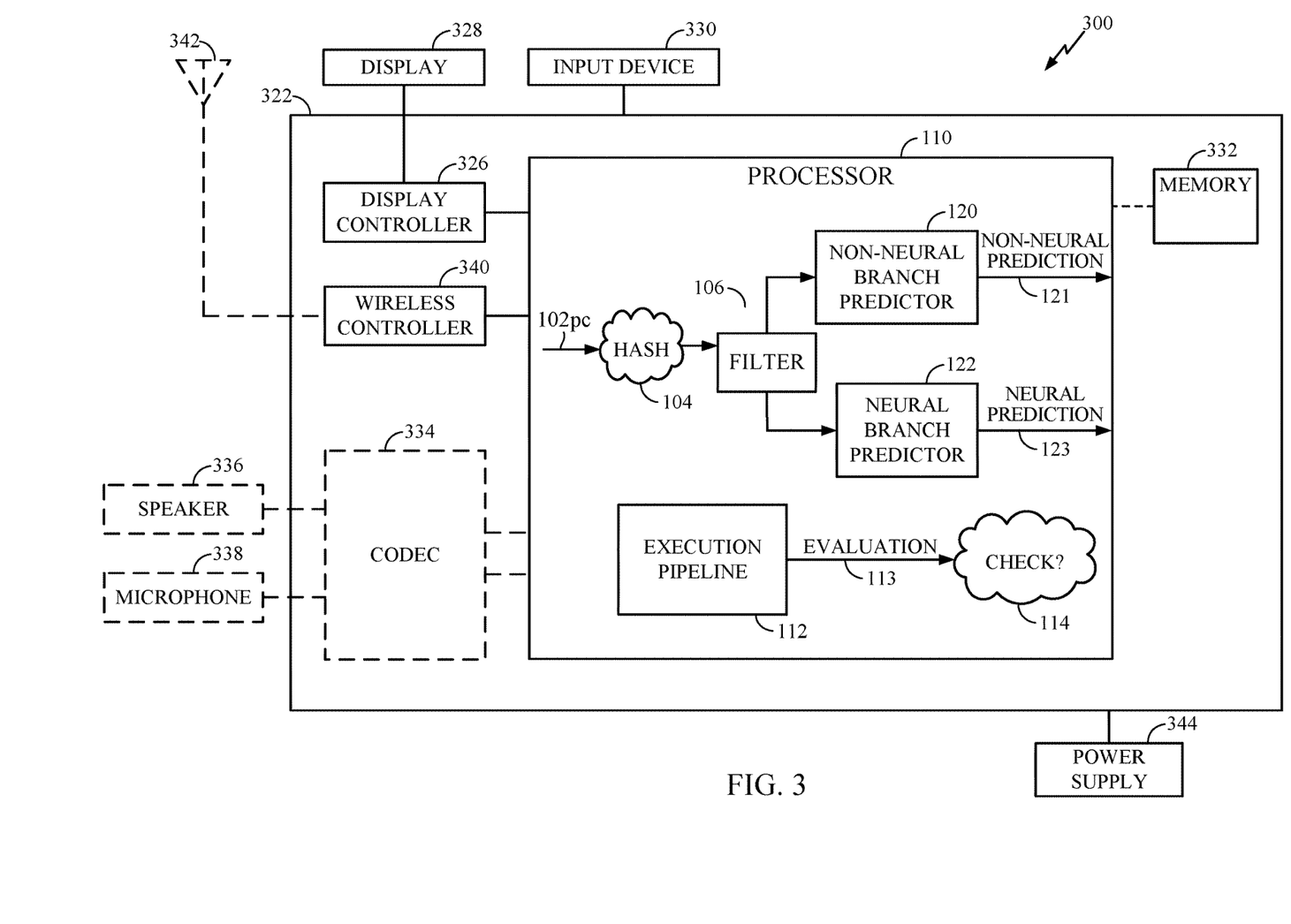
FIG. 3 depicts an exemplary computing device in which an aspect of this disclosure may be advantageously employed.

Another example apparatus, in which exemplary aspects of this disclosure may be utilized, will now be discussed in relation to FIG. 3. FIG. 3 shows a block diagram of computing device 300. Computing device 300 may correspond to an exemplary implementation of a processing system 100 of FIG. 1A, wherein processor 110 may be configured to perform methods 200/250 of FIGS. 2A-B. In the depiction of FIG. 3, computing device 300 is shown to include processor 110, with only limited details (e.g., filter 106, non-neural branch predictor 120, neural branch predictor 122, execution pipeline 112 and prediction check block 114) reproduced from FIG. 1A, for the sake of clarity. Notably, in FIG. 3, processor 110 is exemplarily shown to be coupled to memory 332 and it will be understood that other memory configurations known in the art such as instruction cache 108 have not been shown, although they may be present in computing device 300.

FIG. 3 also shows display controller 326 that is coupled to processor 110 and to display 328. In some cases, computing device 300 may be used for wireless communication, and FIG. 3 also shows optional blocks in dashed lines, such as coder/decoder (CODEC) 334 (e.g., an audio and/or voice CODEC) coupled to processor 110, and speaker 336 and microphone 338 can be coupled to CODEC 334; and wireless antenna 342 coupled to wireless controller 340 which is coupled to processor 110. Where one or more of these optional blocks are present, in a particular aspect, processor 110, display controller 326, memory 332, and wireless controller 340 are included in a system-in-package or system-on-chip device 322.

Accordingly, a particular aspect, input device 330 and power supply 344 are coupled to the system-on-chip device 322. Moreover, in a particular aspect, as illustrated in FIG. 3, where one or more optional blocks are present, display 328, input device 330, speaker 336, microphone 338, wireless antenna 342, and power supply 344 are external to the system-on-chip device 322. However, each of display 328, input device 330, speaker 336, microphone 338, wireless antenna 342, and power supply 344 can be coupled to a component of the system-on-chip device 322, such as an interface or a controller.

It should be noted that although FIG. 3 generally depicts a computing device, processor 110 and memory 332, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for branch prediction. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of branch prediction, the method comprising:
identifying a subset of branch instructions from an execution trace of instructions executed by a processor, wherein the identified subset of branch instructions have greater benefit from branch predictions made by a neural branch predictor than branch predictions made by a non-neural branch predictor; and
during runtime, selectively using the neural branch predictor for obtaining branch predictions of the identified subset of branch instructions, and selectively using the non-neural branch predictor, without using the neural branch predictor, for obtaining branch predictions for the remaining branch instructions outside the identified subset of branch instructions.

2. The method of claim 1, wherein determining that the identified subset of branch instructions have greater benefit from branch predictions made by the neural branch predictor than branch predictions made by the non-neural branch predictor comprises:
determining, for each branch instruction in the execution trace: a frequency of the branch instruction in the execution trace and a difference between misprediction rates using the neural branch predictor and the non-neural branch predictor; and
multiplying the difference by the frequency.

3. The method of claim 2, further comprising pre-training a weight vector matrix of the neural branch predictor to generate a pre-trained weight vector matrix based on the execution trace, the pre-trained weight vector matrix comprising weight vectors for the identified subset of branch instructions.

4. The method of claim 3, further comprising using the pre-trained weight matrix as a static weight vector during runtime, in obtaining branch predictions of the identified subset of branch instructions using the neural branch predictor.

5. The method of claim 3, further comprising using the pre-trained weight matrix as an initial weight vector during runtime, in obtaining branch predictions of the identified subset of branch instructions using the neural branch predictor, and updating the initial weight vector during runtime.

6. The method of claim 1, wherein the neural branch predictor comprises one of a Perceptron, Fast Path, Piecewise Linear branch predictor, or Tage predictor.

7. The method of claim 1, wherein the non-neural branch predictor comprises a bimodal branch predictor.

8. The method of claim 1, wherein selectively using the neural branch predictor for obtaining branch predictions of the identified subset of branch instructions comprises determining, in a filter, whether a branch instruction belongs to the identified subset of branch instructions and directing branch prediction of the branch instruction to the neural branch predictor.

9. The method of claim 8, comprising determining that the branch instruction belongs to the identified subset of branch instructions based on a program counter (PC) of the branch instruction or one or more bits embedded in an encoding of the branch instruction.

10. An apparatus comprising:
a neural branch predictor configured to provide neural branch predictions;
a non-neural branch predictor configured to provide non-neural branch predictions;
a filter configured to identify subset of branch instructions from an execution trace of instructions executed by a processor, wherein the identified subset of branch instructions have greater benefit from branch predictions made by a neural branch predictor than branch predictions made by a non-neural branch predictor;
wherein the filter is configured to, during runtime: selectively direct the identified subset of branch instructions to the neural branch predictor and selectively direct the remaining branch instructions outside the identified subset of branch instructions to the non-neural branch predictor, without directing the remaining branch instructions to the neural branch predictor.

11. The apparatus of claim 10, further comprising logic configured to determine, for each branch instruction in the execution trace: a frequency of the branch instruction in the execution trace and a difference between misprediction rates using the neural branch predictor and the non-neural branch predictor, and multiplying the difference by the frequency.

12. The apparatus of claim 11, further comprising a training block configured to pre-train a weight vector matrix of the neural branch predictor to generate a pre-trained weight vector matrix based on the execution trace, the pre-trained weight vector matrix comprising weight vectors for the identified subset of branch instructions.

13. The apparatus of claim 12, wherein the neural branch predictor is configured to use the pre-trained weight matrix as a static weight vector during runtime to generate branch predictions of the identified subset of branch instructions.

14. The apparatus of claim 12, wherein the neural branch predictor is configured to use the pre-trained weight matrix as an initial weight vector during runtime to generate branch predictions of the identified subset of branch instructions, and update the initial weight vector during runtime.

15. The apparatus of claim 10, wherein the neural branch predictor comprises one of a Perceptron, Fast Path, Piecewise Linear branch predictor, or Tage predictor.

16. The apparatus of claim 10, wherein the non-neural branch predictor comprises a bimodal branch predictor.

17. The apparatus of claim 10, wherein the filter is configured to selectively direct a branch instruction to one of the neural branch predictor or the non-neural branch predictor based on a program counter (PC) of the branch instruction or one or more bits embedded in an encoding of the branch instruction.

18. The apparatus of claim 10, integrated into a device selected from the group consisting of a set top box, a server, a music player, a video player, an entertainment unit, a navigation device, a personal digital assistant (PDA), a fixed location data unit, a computer, a laptop, a tablet, a communications device, and a mobile phone.

19. A non-transitory computer-readable storage medium comprising code, which, when executed by a computer, causes the computer to perform operations for branch prediction, the non-transitory computer-readable storage medium comprising:
   code for identifying a subset of branch instructions from an execution trace of instructions executed by a processor, wherein the identified subset of branch instructions have greater benefit from branch predictions made by a neural branch predictor than branch predictions made by a non-neural branch predictor; and
   code for, during runtime, selectively using the neural branch predictor for obtaining branch predictions of the identified subset of branch instructions, and selectively using the non-neural branch predictor, without using the neural branch predictor, for obtaining branch predictions for the remaining branch instructions outside the identified subset of branch instructions.

20. The non-transitory computer-readable storage medium of claim 19, further comprising code for determining, for each branch instruction in the execution trace: a frequency of the branch instruction in the execution trace and a difference between misprediction rates using the neural branch predictor and the non-neural branch predictor, and code for multiplying the difference by the frequency.

21. The non-transitory computer-readable storage medium of claim 19, further comprising code for pre-training a weight vector matrix of the neural branch predictor to generate a pre-trained weight vector matrix based on the execution trace, the pre-trained weight vector matrix comprising weight vectors for the identified subset of branch instructions.

22. The non-transitory computer-readable storage medium of claim 21, comprising code for using the pre-trained weight matrix as a static weight vector during runtime, in obtaining branch predictions of the identified subset of branch instructions using the neural branch predictor.

23. The non-transitory computer-readable storage medium of claim 21, comprising code for using the pre-trained weight matrix as an initial weight vector during runtime, in obtaining branch predictions of the identified subset of branch instructions using the neural branch predictor, and code for updating the initial weight vector during runtime.

24. The non-transitory computer-readable storage medium of claim 19, comprising code for determining, in a filter, whether a branch instruction belongs to the identified subset of branch instructions and directing branch prediction of the branch instruction to the neural branch predictor.

25. The non-transitory computer-readable storage medium of claim 24, comprising code for determining that the branch instruction belongs to the identified subset of branch instructions based on a program counter (PC) of the branch instruction or one or more bits embedded in an encoding of the branch instruction.

26. A method of branch prediction, the method comprising:
   identifying a subset of branch instructions from an execution trace of instructions executed by a processor, wherein:
      the identified subset of branch instructions have greater benefit from branch predictions made by a neural branch predictor than branch predictions made by a non-neural branch predictor; and
      determining that the identified subset of branch instructions have greater benefit from branch predictions made by the neural branch predictor than branch predictions made by the non-neural branch predictor comprises:
         determining, for each branch instruction in the execution trace: a frequency of the branch instruction in the execution trace and a difference between misprediction rates using the neural branch predictor and the non-neural branch predictor; and
         multiplying the difference by the frequency; and
   during runtime, selectively using the neural branch predictor for obtaining branch predictions of the identified subset of branch instructions, and the non-neural branch predictor for obtaining branch predictions for remaining branch instructions outside the identified subset of branch instructions.

* * * * *